US011867157B2

(12) United States Patent
Staghøj (10) Patent No.: US 11,867,157 B2
(45) Date of Patent: Jan. 9, 2024

(54) METHOD OF COOLING A WIND TURBINE (71) Applicant: Vestas Wind Systems A/S, Aarhus N. (DK)

(72) Inventor: Michael Staghøj, Aarhus N. (DK)

(73) Assignee: Vestas Wind Systems A/S, Aarhus N (DK)

( * ) Notice: Subject to any disclaimer, the term of this patent is extended or adjusted under 35 U.S.C. 154(b) by 312 days.

(21) Appl. No.: 17/293,501

(22) PCT Filed: Nov. 13, 2019

(86) PCT No.: PCT/DK2019/050344
§ 371 (c)(1),
(2) Date: May 13, 2021

(87) PCT Pub. No.: WO2020/098891
PCT Pub. Date: May 22, 2020

(65) Prior Publication Data
US 2022/0003217 A1 Jan. 6, 2022

(30) Foreign Application Priority Data
Nov. 16, 2018 (DK) .......................... PA 2018 70751

(51) Int. Cl.
*F03D 80/60* (2016.01)
*F03D 7/02* (2006.01)

(52) U.S. Cl.
CPC .............. *F03D 80/60* (2016.05); *F03D 7/028* (2013.01); *F03D 7/0272* (2013.01);
(Continued)

(58) Field of Classification Search
CPC combination set(s) only.
See application file for complete search history.

(56) References Cited

U.S. PATENT DOCUMENTS

2010/0133824 A1* 6/2010 Gao ........................ F03D 13/20
290/44
2011/0080001 A1* 4/2011 Gundtoft ................. F03D 7/028
290/44
(Continued)

FOREIGN PATENT DOCUMENTS

CA          2881485 A1    2/2014
CN       102032105 A     4/2011
(Continued)

OTHER PUBLICATIONS

China National Intellectual Property Administration, Office Action issued in corresponding Chinese Patent Application No. 201980075309.8, dated Apr. 13, 2023 with English translation.
(Continued)

*Primary Examiner* — Binh Q Tran
(74) *Attorney, Agent, or Firm* — Wood Herron & Evans LLP (57) ABSTRACT A method of cooling a wind turbine. A cooling system is operated with a first setpoint temperature to cool the wind turbine over a first period. The method comprises measuring a temperature of the wind turbine over the first period to obtain temperature measurements; allocating each of the temperature measurements to a temperature range, wherein one or more of the temperature ranges are critical temperature ranges; and for each critical temperature range, comparing a parameter indicative of a number of the temperature measurements allocated to the critical temperature range with a threshold; selecting a second setpoint temperature on the basis of the comparison(s); and operating the cooling system with the second setpoint temperature over a second period. An equivalent method is also disclosed in which a power setting of the wind turbine is changed on the basis of the comparison(s).

14 Claims, 6 Drawing Sheets (52) U.S. Cl.
CPC ........ *F03D 7/0276* (2013.01); *F05B 2260/20* (2013.01); *F05B 2260/202* (2013.01); *F05B 2260/203* (2013.01); *F05B 2260/205* (2013.01); *F05B 2270/303* (2013.01); *F05B 2270/3032* (2013.01); *F05B 2270/325* (2013.01)

(56) References Cited

U.S. PATENT DOCUMENTS

| | | | |
|---|---|---|---|
| 2011/0163545 A1* | 7/2011 | Hirai | F03D 80/55 290/44 |
| 2012/0253735 A1* | 10/2012 | Hyde | F04D 29/586 165/104.19 |
| 2014/0015252 A1* | 1/2014 | Zhu | F03D 7/0288 290/44 |
| 2016/0348646 A1 | 12/2016 | Barker et al. | |
| 2017/0096983 A1 | 4/2017 | Hales et al. | |
| 2017/0370349 A1* | 12/2017 | Ritter | F03D 80/80 |
| 2019/0140518 A1* | 5/2019 | Groenheden | H02K 9/04 |

FOREIGN PATENT DOCUMENTS

| | | |
|---|---|---|
| EP | 2309122 A1 | 4/2011 |
| EP | 2466128 A1 | 6/2012 |
| EP | 2948679 A1 | 12/2015 |
| EP | 3067555 A1 | 9/2016 |
| WO | 2008131766 A2 | 11/2008 |
| WO | 2015135546 A1 | 9/2015 |

OTHER PUBLICATIONS

Danish Patent and Trademark Office, Search and Examination Report in PA 2018 70851, dated May 7, 2019.
Europeant Patent Office, International Search Report and Written Opinion in PCT Application No. PCT/DK2019/050344, dated Feb. 6, 2020.

* cited by examiner

METHOD OF COOLING A WIND TURBINE

FIELD OF THE INVENTION

The present invention relates to a method of cooling or operating a wind turbine, and associated apparatus.

BACKGROUND OF THE INVENTION

The temperature of a conventional wind turbine may be controlled by a cooling system. It is desirable for the cooling system to have a low capacity (reducing capital expenditure), and/or to drive the cooling system at a low rate (reducing operating expenditure), and/or to operate the wind turbine at a high power setting (to generate more power) without generating excessive temperatures.

SUMMARY OF THE INVENTION

A first aspect of the invention provides a method of cooling a wind turbine, the method comprising: operating a cooling system with a first setpoint temperature to cool the wind turbine over a first period; measuring a temperature of the wind turbine over the first period to obtain temperature measurements; allocating each of the temperature measurements to a temperature range, wherein one or more of the temperature ranges are critical temperature ranges; for each critical temperature range, comparing a parameter indicative of a number of the temperature measurements allocated to the critical temperature range with a threshold; selecting a second setpoint temperature on the basis of the comparison(s); and operating the cooling system with the second setpoint temperature over a second period. If the parameter is less than the threshold for each critical temperature range, then the second setpoint temperature is selected to be higher than the first setpoint temperature; and if the parameter is higher than the threshold for at least one critical temperature range, then the second setpoint temperature is selected to be lower than the first setpoint temperature.

The first aspect of the invention changes the setpoint temperature of the cooling system based on the temperature measurements. This enables the cooling system to be driven at a low rate (associated with a high setpoint temperature) but uses a threshold to prevent excessive temperatures.

Typically the setpoint temperature determines the cooling effect of an element of the cooling system, such as a fan, to cool the wind turbine—a higher setpoint temperature giving a lower cooling effect.

Typically the cooling system compares the setpoint temperature with the temperature measurements and cools the wind turbine over the first period accordingly—for instance on the basis of a feedback control loop or other control process.

Typically the wind turbine comprises a nacelle, the cooling system cools the nacelle, and the temperature measurements indicate a temperature of the nacelle. Alternatively the cooling system may cool another part of the wind turbine such as the tower.

The second setpoint temperature may differ from the first setpoint temperature by a predetermined amount. Alternatively the second setpoint temperature may differ from the first setpoint temperature by an amount which scales on the basis of a gap between the parameter and the threshold for at least one of the critical ranges.

A second aspect of the invention provides a method of operating a wind turbine, the method comprising: operating the wind turbine with a first power setting to generate power over a first period; measuring a temperature of the wind turbine over the first period to obtain temperature measurements; allocating each of the temperature measurements to a temperature range, wherein one or more of the temperature ranges are critical temperature ranges; for each critical temperature range, comparing a parameter indicative of a number of the temperature measurements allocated to the critical temperature range with a threshold; selecting a second power setting on the basis of the comparison(s); and operating the wind turbine with the second power setting over a second period. If the parameter is lower than the threshold for each critical temperature range, then the second power setting is selected to be higher than the first power setting; and if the parameter is greater than the threshold for at least one of the critical temperature ranges, then the second power setting is selected to be lower than the first power setting.

The second aspect of the invention changes the power setting of the wind turbine based on the temperature measurements. This enables the wind turbine to generate high power (associated with a high power setting) but uses a threshold to prevent excessive temperatures.

The following comments apply to both aspects of the invention.

One or more of the temperature ranges are critical temperature ranges. Some of the temperature ranges may not be critical temperature ranges, or all of the temperature ranges may be critical temperature ranges.

A critical temperature range may be a temperature range which is designated as critical, for instance based on predetermined criteria or user selection. By way of example, very low temperature ranges may not be designated as critical because operating at very low temperature is not detrimental, or very high temperature ranges may not be designated as critical because very high temperatures are rarely experienced. The critical temperature ranges may therefore be one or more temperature ranges that are critical to the operation of particular wind turbines.

The first and second periods may each be greater than one day, or they may each be one week or greater. For instance the first and second periods may each be one or more weeks, one or more months or one or more years. Preferably the first and second periods are each more than one week.

Typically the first period has the same duration as the second period, although they may be different.

The parameter may be indicative of a proportion of the temperature measurements allocated to the critical temperature range—for instance a percentage.

The threshold may be set for each critical temperature range by statistically analysing a calibration set of temperature measurements. For instance each threshold may be set on the basis of a standard deviation value obtained by statistically analysing the calibration set of temperature measurements.

The method may be repeated over one or more further periods.

A further aspect of the invention provides a wind turbine cooling system configured to cool a wind turbine by the method of the first aspect.

A further aspect of the invention provides a wind turbine power control system configured to operate a wind turbine by the method of the second aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
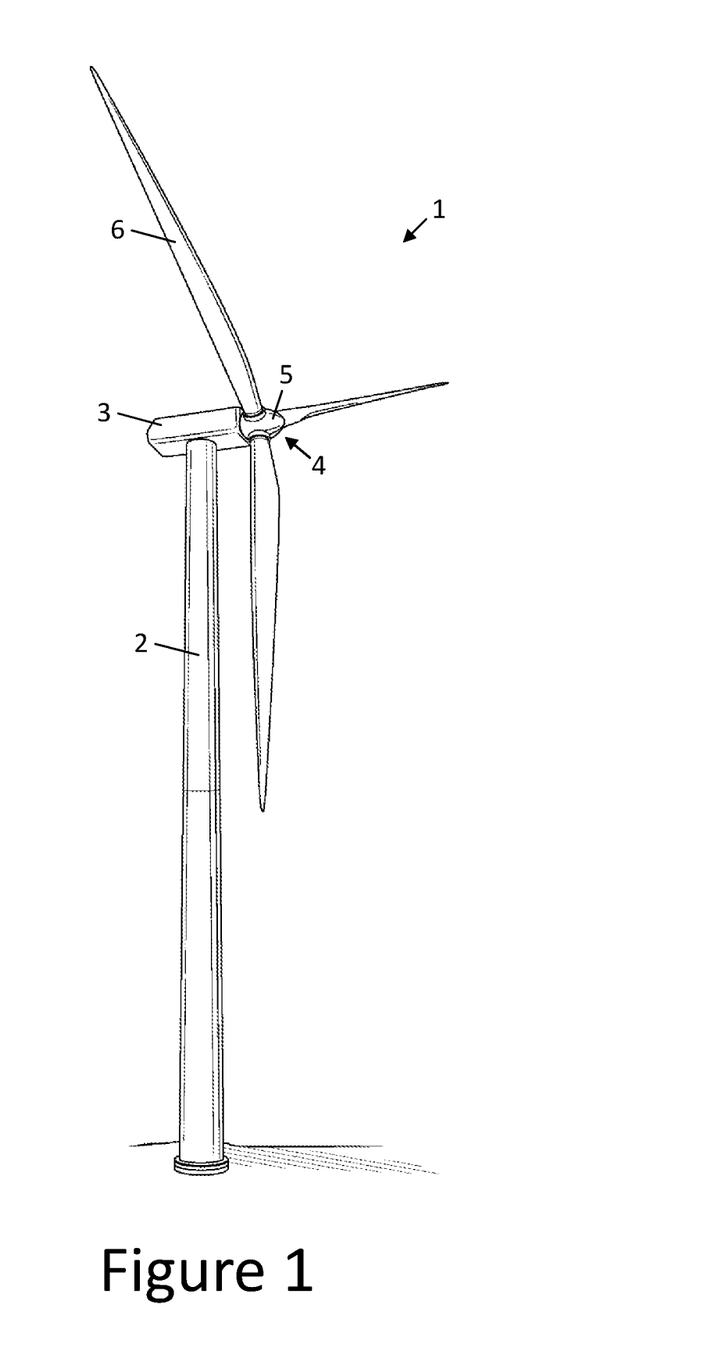
FIG. 1 shows a wind turbine.

FIG. 1 shows a wind turbine 1 comprising a tower 2, a nacelle 3, and a horizontal-axis rotor 4 comprising a hub 5 and three blades 6. The nacelle 3 houses a cooling system shown in FIG. 2. The cooling system comprises a fan 21, a temperature sensor 22 and a cooling controller 23.

Figure 2:
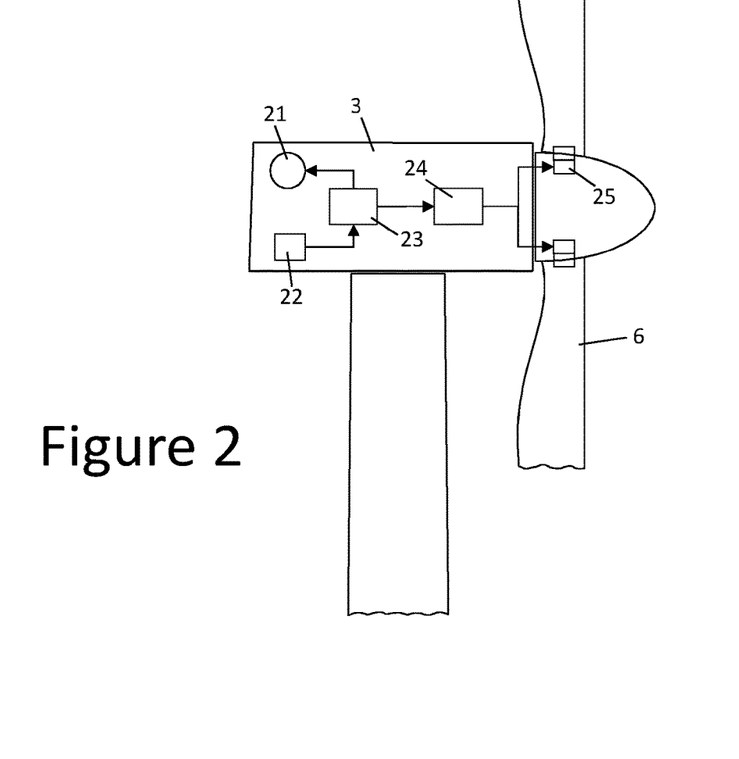
FIG. 2 shows a cooling system and power control system of the wind turbine.

The cooling controller 23 may be a unit or collection of functional units which comprises one or more processors, input/output interface(s) and a memory capable of storing instructions which can be executed by a processor.

Figure 3:
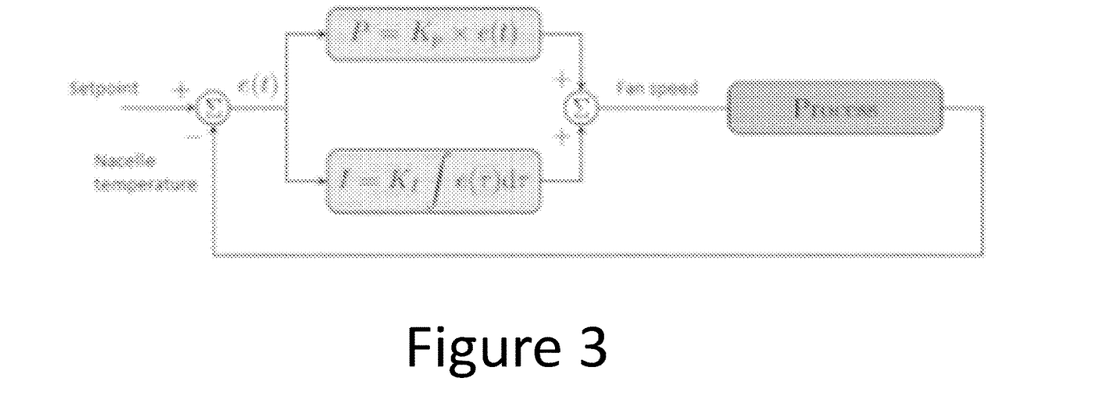
FIG. 3 shows a PI control loop.

The cooling controller 23 operates the fan 21 to cool the interior of the nacelle 3 using a proportional-integral (PI) feedback control loop shown in FIG. 3. A setpoint temperature is compared with a nacelle temperature from the sensor 22 to generate an error signal e(t). The error signal e(t) is input to a "proportional" leg of the PI control loop to generate a proportional signal, and the error e(t) is also input to an "integral" leg of the PI control loop to generate an integral signal. The proportional and integral signals are summed to generate a fan speed control signal which is used to control the fan 21.

Typically when the nacelle temperature is below the setpoint temperature, then the fan 21 is turned off; and when the nacelle temperature exceeds the setpoint temperature the fan 21 is turned on and the fan speed controlled on the basis of the proportional and integral signals. Therefore the setpoint temperature controls the temperature of the nacelle and the rating of the cooling system—a high setpoint temperature typically resulting in a high temperature and a high rating.

The nacelle 3 also houses a power control system including a power controller 24 which controls the power generated by the wind turbine on the basis of a power setting—for instance 4 MW. A high power setting results in a high power being generated, and a low power setting results in a low power being generated. The power generated by the wind turbine can be controlled, for example, by operating pitch control mechanisms 25 which control the pitch angle of the blades 6.

The power controller 24 may be a unit or collection of functional units which comprises one or more processors, input/output interface(s) and a memory capable of storing instructions which can be executed by a processor.

Figure 4:
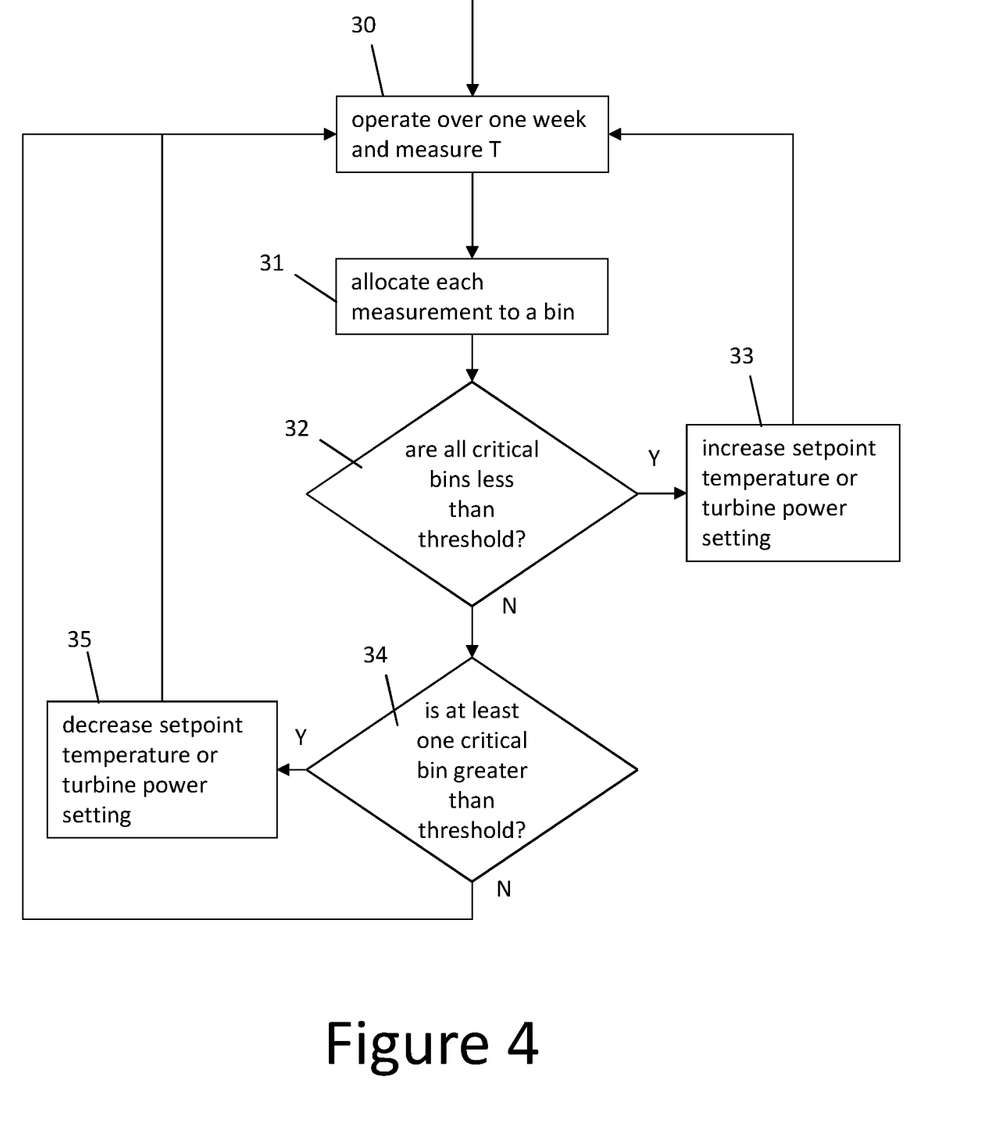
FIG. 4 shows a method of operating and cooling the wind turbine.

A method of operating and cooling the wind turbine 1 is shown in FIG. 4. The method of FIG. 4 is performed by the cooling controller 23 and the power controller 24 which execute software code provided by a computer program product. The computer program product may be provided on a computer readable storage medium or be downloadable from a communication network. The computer program product comprises software code to cause a data processing system, e.g. in the form of a controller, to carry out instructions when loaded onto the data processing system.

In a first instance of step 30, the power controller 24 operates the wind turbine over a first period (such as a week, month or year) with a first power setting (for instance 4 MW) and the cooling system 21-23 is operated over the first period with a first setpoint temperature (for instance 15° C.). During the first period, a temperature of the nacelle 3 is measured by the sensor 22 to obtain a set of temperature measurements.

Figure 6:
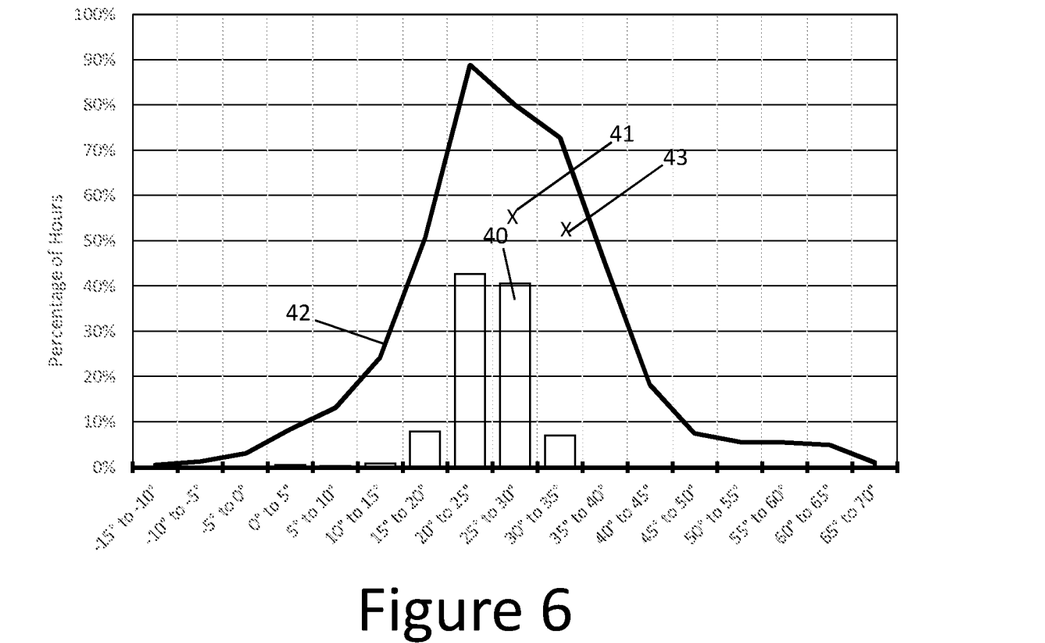
FIG. 6 is a histogram showing percentages allocated to temperature ranges over a first period.

Each of the temperature measurements in the set is allocated to a temperature range or bin in step 31. FIG. 6 gives an example in which each temperature measurement is allocated to a five degree temperature range.

For each temperature range, a parameter indicative of a number of the temperature measurements is calculated. In this example the parameter is a percentage, although it could be an absolute number. FIG. 6 illustrates the parameters as a histogram. For instance the 25° C. to 30° C. range has been allocated about 40% of the measurements taken in that period, as indicated by bar 40.

At least one of the temperature ranges is previously designated as a critical temperature range. In FIG. 6 only two of the seventeen temperature ranges (25° C. to 30° C., and 30° C. to 35° C.) are designated as critical temperature ranges. In alternative embodiments there may be only a single critical temperature range, or all of the temperature ranges may be designated as critical.

Each critical temperature range has a respective threshold which is indicated by a cross in FIG. 6. So the 25° C. to 30° C. critical range has a threshold of 56% indicated by a cross 41, and the 30° C. to 35° C. critical range has a threshold of 52% indicated by a cross 43.

For each critical temperature range, the percentage allocated to the critical temperature range is compared with its respective threshold, and in steps 32-35 a second setpoint temperature or power setting is selected on the basis of the comparison(s).

If the percentage is determined to be less than the threshold for each critical temperature range at step 32, then the setpoint temperature or power setting is increased at step 33. In other words, either the second setpoint temperature is selected to be higher than the first setpoint temperature, or the second power setting is selected to be higher than the first power setting. The setpoint temperature or power setting may be increased by a predetermined amount (for instance 1° C. or 0.1 MW). Alternatively the size of the increase may be scaled on the basis of the gap from the threshold.

In the example of FIG. 6, the percentages for the critical ranges are well below their respective thresholds, so the setpoint temperature or power setting is increased for the next period. The increase may be large because there is a large gap to each threshold.

Figure 7:
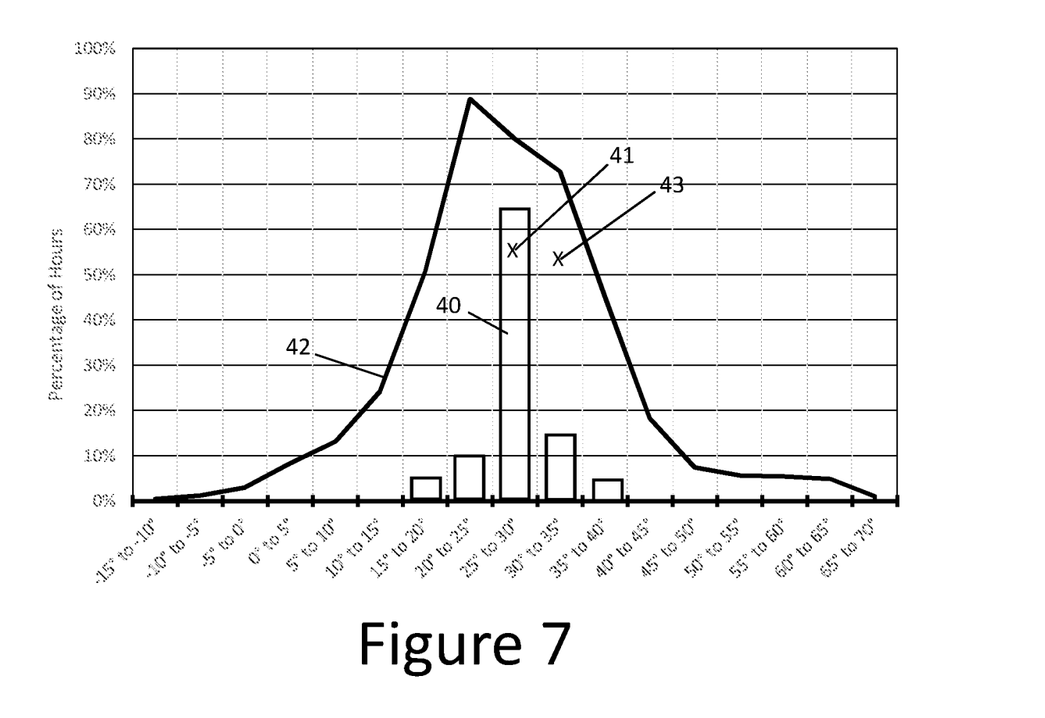
FIG. 7 is a histogram showing percentages allocated to temperature ranges over a second period.

The process is then repeated for a second period (such as a week, month or year), which may result in higher temperatures as shown in FIG. 7. If the percentage is determined to be higher than the threshold for at least one critical temperature range at step 34, then the setpoint temperature or power setting is decreased at step 35. In other words, either the second setpoint temperature is selected to be lower than the first setpoint temperature, or the second power setting is selected to be lower than the first power setting. The setpoint temperature or power setting may be decreased by a predetermined amount (for instance 1° C. or 0.1 MW). Alternatively the size of the decrease may be scaled on the basis of the gap from the threshold.

In the example of FIG. 7, the percentage 40 for the 25° C. to 30° C. critical range has gone above its threshold 41 (56%), so the setpoint temperature or power setting is decreased for the next period. The decrease may be small because the 25° C. to 30° C. critical range has only gone slightly above its threshold.

The process then repeats so in the next period the temperature measurements should be lower.

In the unlikely situation of all of the percentages being equal to their respective thresholds, then the setpoint temperature and power setting are not changed. Alternatively, as shown in FIG. 5, step 34 may be omitted so that the setpoint temperature or power setting is changed every period.

Figure 5:
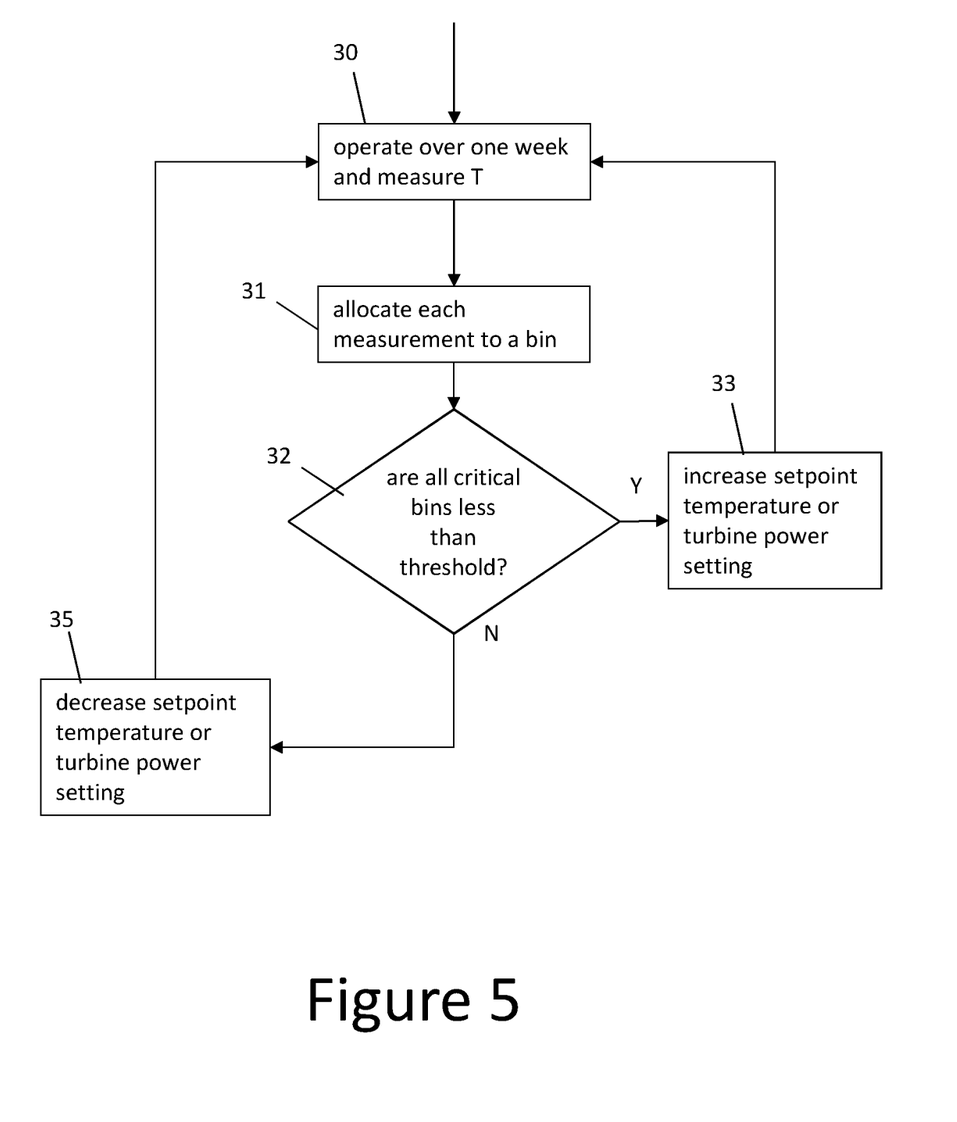
FIG. 5 shows an alternative method of operating and cooling the wind turbine.

By appropriate designation of critical temperature ranges and their respective thresholds, the process of FIGS. 4 and 5 enables the wind turbine to be operated at a high setpoint temperature or power setting, whilst ensuring that temperatures do not become too high for a long period.

If the setpoint temperature remains above a certain point for a long period of time, then this indicates that the cooling capacity required from the cooling system is lower than expected when the fan 21 was installed. So at the next maintenance of the wind turbine, the fan 21 can be replaced by a smaller fan and the setpoint temperature returned to its initial value.

In the case of a component failure, e.g. one out of two fans have failed, the setpoint can either be reset to the original value, or any other pre-set value to reduce the amount of hours in the higher bins as much as possible.

Figure 8:
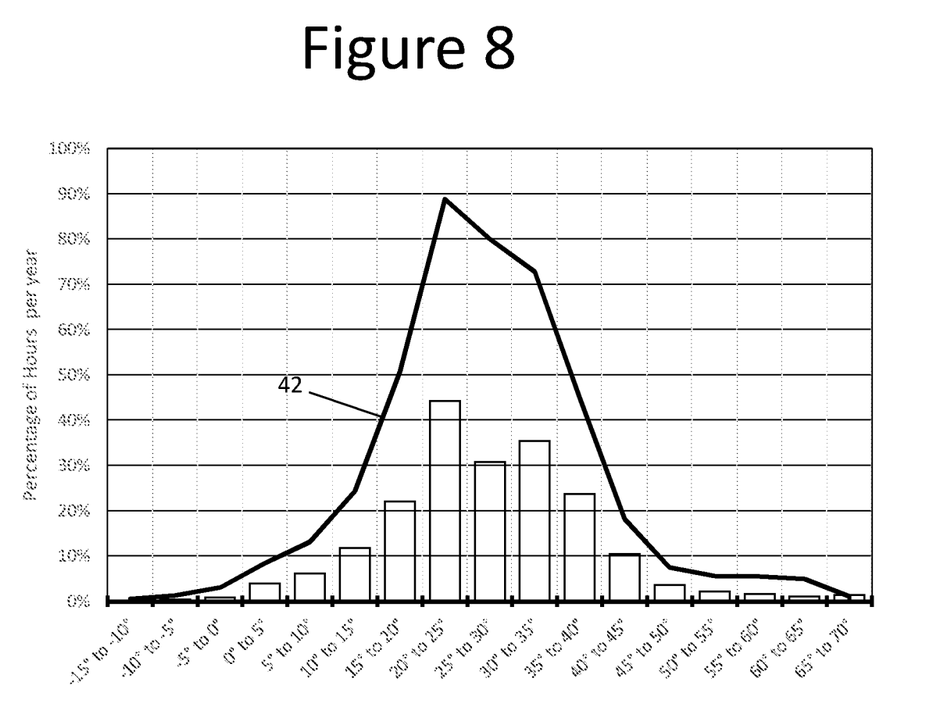
FIG. 8 is a histogram showing maximum and sigma:7 values for a calibration data set.

One method of setting the thresholds for the critical temperature ranges is shown in FIG. 8. In this case, the thresholds are set by statistically analysing a calibration set of temperature measurements taken from a large population of wind turbines over the course of a year, all having an equivalent design. Each temperature measurement in the calibration set is allocated to a temperature range or bin, and at the end of the year each turbine has a percentage for each bin, the percentages for that turbine adding up to 100%.

Each bin has a set of percentages (one per wind turbine) and the maximum percentage from the total population for each bin is shown by the histogram bars in FIG. 8. So for example the 20° C. to 25° C. range has a maximum percentage of 44%, and the 30° C. to 35° C. range has a maximum percentage of 35% (most likely taken from different wind turbines in the population). Each bin is also statistically analysed to determine a sigma:7 value—this is a percentage which is seven standard deviations away from the mean. So for example the 20° C. to 25° C. range has a sigma:7 value of 88%, and the 30° C. to 35° C. range has a sigma:7 value of 73%. The sigma:7 values are indicated by a line 42 which is also shown in FIGS. 6 and 7. The thresholds indicated by the crosses in FIGS. 6 and 7 may be set on the basis of the maximum percentage and sigma:7 values shown in FIG. 8. For example the threshold for each bin may be set at the mid-point between the maximum percentage and the sigma:7 value. Other methods of determining the thresholds by statistical analysis are possible, for example using different standard deviation values such as sigma:3, sigma:4 or sigma:5.

The examples above relate to a histogram with seventeen temperature ranges. In a simpler example with only two temperature ranges the process may operate as follows:

1) The wind turbine is designed to be able to run 100% from 0-10° C. and 75% from 10-20° C.

2) The setpoint temperature is initially 10° C.

3) One year's data shows an actual wind turbine operates 50% in each bin 4) 10-20° C. is designated as critical 5) The setpoint is increased to 13° C.

6) Some more time passes

7) The wind turbine now operates 55% in 10-20° C.

8) The setpoint temperature is increased to 14° C.

9) The wind turbine now operates 70% in 10-20° C.

10) The setpoint is maintained to ensure the threshold will not be exceeded.

Although the invention has been described above with reference to one or more preferred embodiments, features of one embodiment may be applicable to other embodiments and it will be appreciated that various changes or modifications may be made without departing from the scope of the invention as defined in the appended claims.

The invention claimed is:

1. A method of cooling a wind turbine, the method comprising:
    operating a cooling system with a first setpoint temperature to cool the wind turbine over a first period;
    measuring a temperature of the wind turbine over the first period to obtain temperature measurements;
    allocating each of the temperature measurements to a temperature range, wherein one or more of the temperature ranges are critical temperature ranges;
    for each critical temperature range, comparing a parameter indicative of a number of the temperature measurements allocated to the critical temperature range with a threshold;
    selecting a second setpoint temperature on the basis of the comparison(s); and
    operating the cooling system with the second setpoint temperature over a second period,
    wherein if the parameter is less than the threshold for each critical temperature range, then the second setpoint temperature is selected to be higher than the first setpoint temperature; and if the parameter is higher than the threshold for at least one critical temperature range, then the second setpoint temperature is selected to be lower than the first setpoint temperature.

2. The method according to claim 1, wherein the setpoint temperature determines the cooling effect of an element of the cooling system to cool the wind turbine.

3. The method according to claim 1, wherein the wind turbine comprises a nacelle, the cooling system cools the nacelle, and the temperature measurements indicate a temperature of the nacelle.

4. The method according to claim 1, wherein the second setpoint temperature differs from the first setpoint temperature by a predetermined amount.

5. The method according to claim 1, wherein the cooling system compares the first setpoint temperature with the temperature measurements and cools the wind turbine over the first period accordingly.

6. A method of operating a wind turbine, the method comprising:
    operating the wind turbine with a first power setting to generate power over a first period;

measuring a temperature of the wind turbine over the first period to obtain temperature measurements;

allocating each of the temperature measurements to a temperature range, wherein one or more of the temperature ranges are critical temperature ranges;

for each critical temperature range, comparing a parameter indicative of a number of the temperature measurements allocated to the critical temperature range with a threshold;

selecting a second power setting on the basis of the comparison(s); and operating the wind turbine with the second power setting over a second period;

wherein if the parameter is lower than the threshold for each critical temperature range, then the second power setting is selected to be higher than the first power setting; and if the parameter is greater than the threshold for at least one of the critical temperature ranges, then the second power setting is selected to be lower than the first power setting.

7. The method according to claim 1, wherein the parameter is indicative of a proportion of the temperature measurements allocated to the critical temperature range.

8. The method according to claim 1, further comprising before the first period setting the threshold for each critical temperature range by statistically analysing a calibration set of temperature measurements.

9. The method according to claim 8, wherein each threshold is set on the basis of a standard deviation value obtained by statistically analysing the calibration set of temperature measurements.

10. The method according to claim 1, further comprising repeating the method over one or more further periods.

11. The method according to claim 1, wherein some of the temperature ranges are not critical temperature ranges.

12. A wind turbine cooling system configured to cool a wind turbine by the method of claim 1.

13. A wind turbine power control system configured to operate a wind turbine by the method of claim 6.

14. A computer program product comprising software code adapted to control a cooling system or a wind turbine when executed on a data processing system, the computer program product being adapted to perform the method of claim 1.

* * * * *